(12) United States Patent
Moloney et al.

(10) Patent No.: US 12,137,746 B2
(45) Date of Patent: Nov. 12, 2024

(54) AEROSOL PROVISION SYSTEM

(71) Applicant: Nicoventures Trading Limited, London (GB)

(72) Inventors: Patrick Moloney, London (GB); Anton Korus, London (GB); Will England, London (GB); William Hart, London (GB); Conor McGrath, London (GB)

(73) Assignee: NICOVENTURES TRADING LIMITED, London (GB)

( * ) Notice: Subject to any disclaimer, the term of this patent is extended or adjusted under 35 U.S.C. 154(b) by 682 days.

(21) Appl. No.: 17/309,822

(22) PCT Filed: Dec. 19, 2019

(86) PCT No.: PCT/GB2019/053634
§ 371 (c)(1),
(2) Date: Jun. 21, 2021

(87) PCT Pub. No.: WO2020/128491
PCT Pub. Date: Jun. 25, 2020

(65) Prior Publication Data
US 2022/0087322 A1 Mar. 24, 2022

(30) Foreign Application Priority Data
Dec. 20, 2018 (GB) .................................... 1820890

(51) Int. Cl.
*A24F 40/53* (2020.01)
*A24F 40/42* (2020.01)
(Continued)

(52) U.S. Cl.
CPC .............. *A24F 40/53* (2020.01); *A24F 40/42* (2020.01); *A24F 40/485* (2020.01); *A24F 40/70* (2020.01);
(Continued)

(58) Field of Classification Search
CPC ........ A24F 40/53; A24F 40/70; A24F 40/485; A24F 40/42; G06K 7/10366; G06K 19/0723
(Continued)

(56) References Cited

U.S. PATENT DOCUMENTS 10,045,567 B2 * 8/2018 Monsees .............. H05B 1/0244
10,045,568 B2 * 8/2018 Monsees .................. H05B 3/44
(Continued)

FOREIGN PATENT DOCUMENTS

CA          2827144 A1 *  3/2015  ........... A24F 47/008
JP       2005198538 A      7/2005
(Continued)

OTHER PUBLICATIONS

International Search Report and Written Opinion, International Application No. PCT/GB2019/053634, mailing date Mar. 25, 2020, 15 pages.
(Continued)

*Primary Examiner* — Peter G Leigh
(74) *Attorney, Agent, or Firm* — Burr & Forman LLP

(57) ABSTRACT

An aerosol provision system for generating an aerosol for user inhalation comprises a cartridge comprising a housing containing an aerosolizable material, and an aerosol provision device having an interface configured operatively to receive the cartridge. The aerosol provision device is configured in use to cause the aerosolizable material to generate the aerosol for user inhalation by providing heat/power to the aerosol generating material. The cartridge includes a data storage unit configured to store information relating to the cartridge, the aerosol provision device being configured to detect the identifier stored in the data storage unit when cartridge is received by the aerosol provision device. Embodiments of the present technique can be arranged to
(Continued)

provide a cartridge with data storage unit integrally formed with one or more walls of the cartridge's housing. In one example the data storage unit is integrally formed with the one or more walls of the housing by embedding circuitry forming the data storage unit in or below a surface of one of the walls of the housing. The embedding of the circuitry of the data storage unit integrally forms the circuitry with the wall of the housing with the effect that removal of the data storage unit causes one or both of the data storage unit or the aerosol generating material to be rendered inoperable.

37 Claims, 7 Drawing Sheets

(51) Int. Cl.
 *A24F 40/485* (2020.01)
 *A24F 40/70* (2020.01)
 *G06K 7/10* (2006.01)
 *G06K 19/07* (2006.01)
(52) U.S. Cl.
 CPC ..... *G06K 7/10366* (2013.01); *G06K 19/0723* (2013.01)
(58) Field of Classification Search
 USPC .......................................................... 131/329
 See application file for complete search history.

(56) References Cited

U.S. PATENT DOCUMENTS

| | | | | |
|---|---|---|---|---|
| 10,070,669 | B2* | 9/2018 | Monsees | A24B 15/167 |
| 10,076,139 | B2* | 9/2018 | Monsees | A61M 15/06 |
| 10,104,915 | B2* | 10/2018 | Bowen | A61M 11/06 |
| 2017/0135404 | A1* | 5/2017 | Reevell | A24F 40/53 |
| 2018/0169357 | A1* | 6/2018 | Reevell | A61M 15/06 |
| 2018/0295881 | A1* | 10/2018 | Mironov | H05B 3/26 |

FOREIGN PATENT DOCUMENTS

| | | | | |
|---|---|---|---|---|
| JP | 2017510270 A | | 4/2017 | |
| JP | 2018531582 A | | 11/2018 | |
| WO | WO-2015082560 A1 | * | 6/2015 | .......... A24B 15/167 |
| WO | 2016143079 A1 | | 9/2016 | |
| WO | WO 2017/084848 A1 | | 5/2017 | |
| WO | WO-2017084849 A1 | * | 5/2017 | .......... A24B 15/167 |
| WO | WO-2017163045 A1 | * | 9/2017 | ............ A24F 40/40 |
| WO | 2017205692 A1 | | 11/2017 | |
| WO | 2018172555 A1 | | 9/2018 | |

OTHER PUBLICATIONS

Notice of Allowance issued in corresponding Japanese Patent Application No. 2022-173091 mailed Mar. 19, 2024, all pages cited in its entirety.

* cited by examiner

AEROSOL PROVISION SYSTEM

PRIORITY CLAIM

The present application is a National Phase entry of PCT Application No. PCT/GB2019/053634, filed Dec. 19, 2019, which claims priority from GB Patent Application No. 1820890.0, filed Dec. 20, 2018, which is hereby fully incorporated herein by reference.

FIELD

The present disclosure relates to electronic vapor or aerosol provision systems such as nicotine delivery systems (e.g. electronic cigarettes and the like).

BACKGROUND

Electronic vapor or aerosol provision systems such as electronic cigarettes (e-cigarettes) generally contain a vapor precursor material, such as a reservoir of a source liquid containing a formulation, which may or may not include nicotine, or a solid material such as a tobacco-based product, from which a vapor is generated for inhalation by a user, for example through heat vaporization. Thus, a vapor provision system will typically comprise a vapor generation chamber containing a vaporizer, e.g. a heating element, arranged to vaporize a portion of precursor material to generate a vapor in the vapor generation chamber. As a user inhales on the device and electrical power is supplied to the vaporizer, air is drawn into the device through inlet holes and into the vapor generation chamber where the air mixes with the vaporized vaporized precursor material and forms a condensation aerosol. There is a flow path between the vapor generation chamber and an opening in the mouthpiece so the incoming air drawn through the vapor generation chamber continues along the flow path to the mouthpiece opening, carrying some of the vapor/condensation aerosol with it, and out through the mouthpiece opening for inhalation by the user. Some electronic cigarettes may also include a flavor element in the flow path through the device to impart additional flavors. Such devices may sometimes be referred to as hybrid devices and the flavor element may, for example, include a portion of tobacco arranged in the air path between the vapor generation chamber and the mouthpiece so that vapor/condensation aerosol drawn through the devices passes through the portion of tobacco before exiting the mouthpiece for user inhalation.

In some systems the supply of power to the vaporizer is activated manually, for example by a user pressing an activation button when they wish to generate vapor for inhalation. Devices that operate in this way may be referred to as button-activated/button-actuated devices. In some other systems the supply of power to the vaporizer is activated automatically in response to user inhalation, for example using a pressure or airflow sensor to detect when a user is inhaling on the device. Devices that operate in this way may be referred to as puff-activated/puff-actuated devices.

Aerosol provision systems are generally formed from an aerosol provision device, which is reusable, and a cartridge or consumable which is formed of lower cost components and can be designed to be thrown away after use (i.e., after the aerosolizable material has been aerosolized). Since the cartridges are generally reasonably inexpensive to manufacture, cartridges can be manufactured to have a correct size or electrical connections for use with a given aerosol provision device. However, this arrangement has a disadvantage in that counterfeit cartridges can be manufactured with the correct configuration in order to be used with the given aerosol provision device. These counterfeit cartridges may not adhere to the strict manufacturing or distributing regulations normally imposed on genuine cartridges, an in particular to the liquids stored within the cartridges, which can lead to poor quality and a lower quality user experience.

Various approaches are described which seek to help address some of these issues.

SUMMARY

According to a first aspect of certain embodiments there is provided an aerosol provision system for generating an aerosol for user inhalation. The system comprises a cartridge comprising a housing containing an aerosolizable material, and an aerosol provision device having an interface configured operatively to receive the cartridge. The aerosol provision device is configured in use to cause the aerosolizable material to generate the aerosol for user inhalation by providing heat/power to the aerosol generating material. The cartridge includes a data storage unit configured to store information relating to the cartridge, the aerosol provision device being configured to detect the identifier stored in the data storage unit when cartridge is received by the aerosol provision device. Embodiments of the present technique can be arranged to provide a cartridge with data storage unit integrally formed with one or more walls of the cartridge's housing.

In one example the data storage unit is integrally formed with the one or more walls of the housing by embedding circuitry forming the data storage unit in or below a surface of one of the walls of the housing. The embedding of the circuitry of the data storage unit integrally forms the circuitry with the wall of the housing with the effect that removal of the data storage unit causes one or both of the data storage unit or the aerosol generating material to be rendered inoperable.

Embodiments of the present technique can provide cartridges with a data storage unit integrally formed with one or more walls of the housing with the effect that attempted removal of the data storage unit is likely to render one or both of the data storage unit or the cartridge in operable.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

Embodiments of the present technique will now be described, by way of example only, with reference to the accompanying drawings, in which like parts have identical numerical references and in which:

FIG. 1 schematically shows in highly schematic cross-section a vapor provision system in accordance with certain embodiments of the disclosure comprising an aerosol provision device and a cartridge;

FIG. 2*a* schematically shows a three dimensional representation of another example of an aerosol provision system shown in FIG. 1 in a non-uniform shape (contrasting with the rod shape of FIG. 1); and FIG. 2*b* is a simplified cross-sectional view of the aerosol provision system of FIG. 2*a;*

FIG. 3a is a three dimensional representation of the cartridge shown in FIGS. 2a and 2b including a data storage unit according to the present technique; FIG. 3b is a representation of a side view of the cartridge of FIG. 3a from position B; and FIG. 3c is a plan view of the cartridge of FIG. 3a when viewed from position C;

FIG. 4a is a representation of a three dimensional representation of first layer which is arranged to form another example of a cartridge embodying the present technique including a data storage unit according to the present technique; FIG. 4b is a three dimensional representation of a second layer of the cartridge, which is combined to form the aerosol generating cartridge which is shown as a three dimensional view in FIG. 4c;

Figure 7:
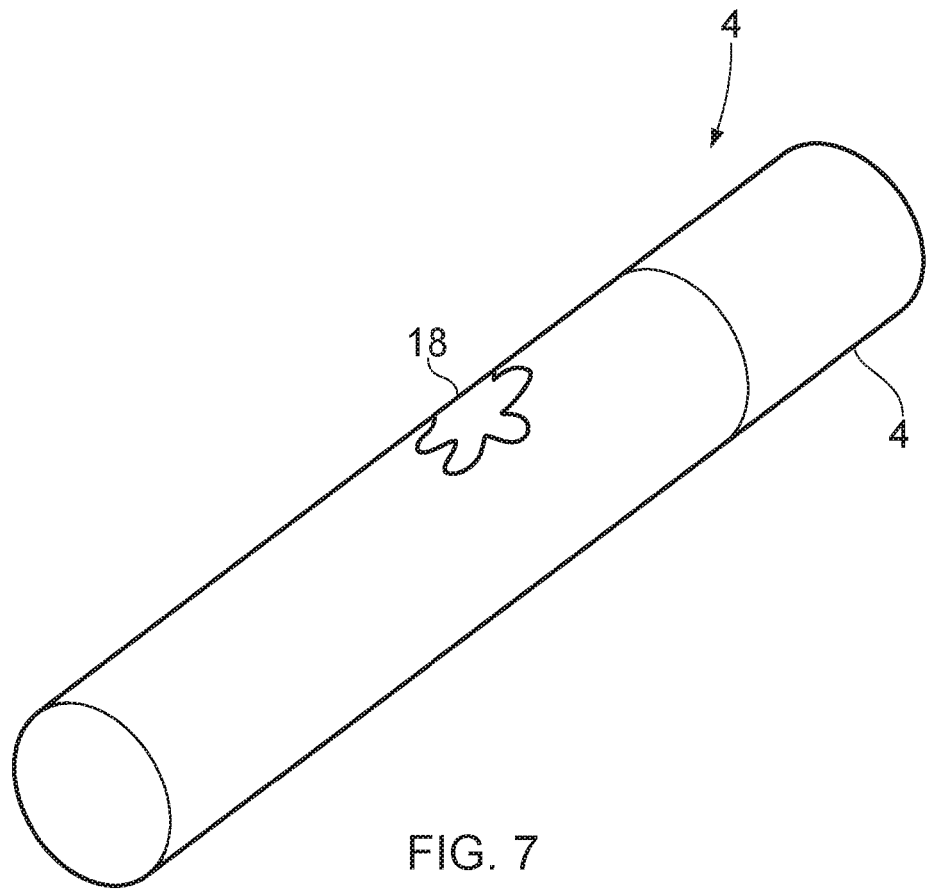
Figure 8:
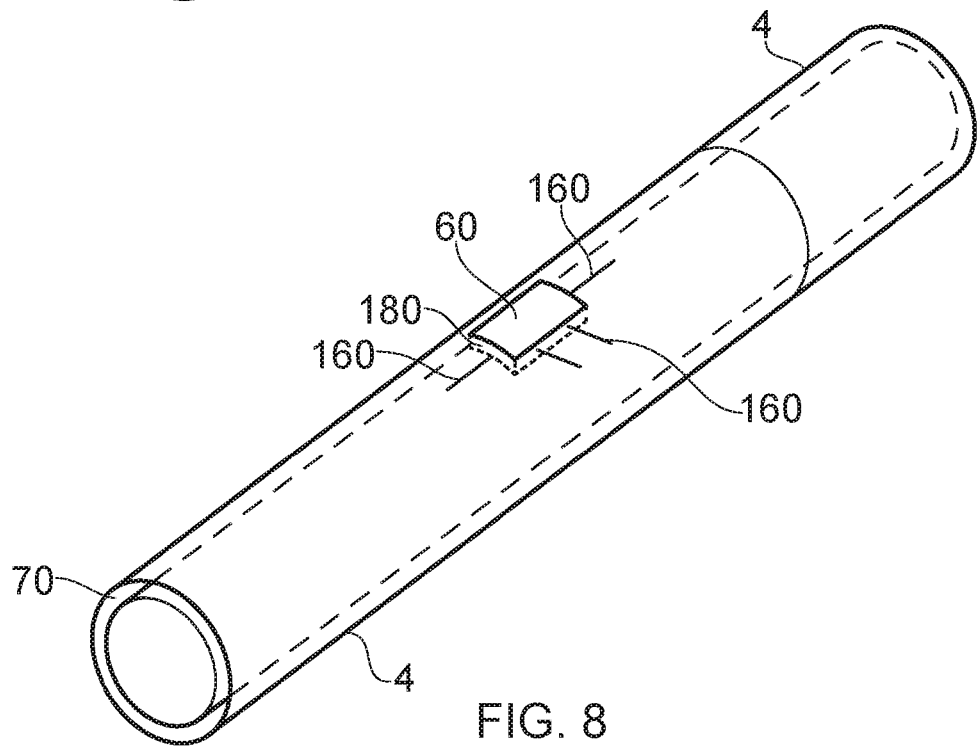

FIG. 7 is a is a three dimensional representation of another example of a cartridge including a data storage unit according to an embodiment of the present technique, in which the data storage unit is visible on the surface of the cartridge and configured with a recognizable authentication pattern; and FIG. 8 is a is a three dimensional representation of a cartridge including a data storage unit according to an embodiment of the present technique, in which the data storage unit is configured to be frangibly attached in a through-hole of a housing of the article with connections to electrical circuits.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to vapor provision systems, which may also be referred to as aerosol provision systems, such as e-cigarettes, including hybrid devices. Throughout the following description the term "e-cigarette" or "electronic cigarette" may sometimes be used, but it will be appreciated this term may be used interchangeably with vapor provision system/device and electronic vapor provision system/device. Furthermore, and as is common in the technical field, the terms "vapor" and "aerosol", and related terms such as "vaporize", "volatilize" and "aerosolise", may generally be used interchangeably.

Vapor provision systems (e-cigarettes) often, though not always, comprise a modular assembly including both an aerosol provision device and a replaceable (disposable) cartridge part. Often the replaceable cartridge part will comprise the vapor precursor material (sometimes referred to herein as aerosolizable material) and the vaporizer and the aerosol provision device will comprise the power supply (e.g. rechargeable battery), activation mechanism (e.g. button or puff sensor), and control circuitry. However, it will be appreciated these different parts may also comprise further elements depending on functionality. For example, for a hybrid device the cartridge part may also comprise an additional flavor or aerosol modifying element, e.g. a portion of tobacco, provided as an insert ("pod"). In such cases the flavor element insert may itself be removable from the disposable cartridge part so it can be replaced separately from the cartridge, for example to change flavor or because the usable lifetime of the flavor element insert is less than the usable lifetime of the vapor generating components of the cartridge. In other implementations, the flavor element is integrally provided with the cartridge. The reusable device part will often also comprise additional components, such as a user interface for receiving user input and displaying operating status characteristics.

For modular devices a cartridge and control unit are electrically and mechanically coupled together for use, for example using a screw thread, latching or bayonet fixing with appropriately engaging electrical contacts. When the vapor precursor material in a cartridge is exhausted, or the user wishes to switch to a different cartridge having a different vapor precursor material, a cartridge may be removed from the control unit and a replacement cartridge attached in its place. Devices conforming to this type of two-part modular configuration may generally be referred to as two-part devices or multi-part devices.

It is relatively common for electronic cigarettes, including multi-part devices, to have a generally elongate shape and, for the sake of providing a concrete example, certain embodiments of the disclosure described herein will be taken to comprise a generally elongate multi-part device employing disposable cartridges with a tobacco pod insert. More generally, it will be appreciated certain embodiments of the disclosure are based on electronic cigarettes that are configured to provide activation functionality in accordance with the principles described herein, and the specific constructional aspects of electronic cigarette configured to provide the described activation functionality are not of primary significance.

Figure 1:
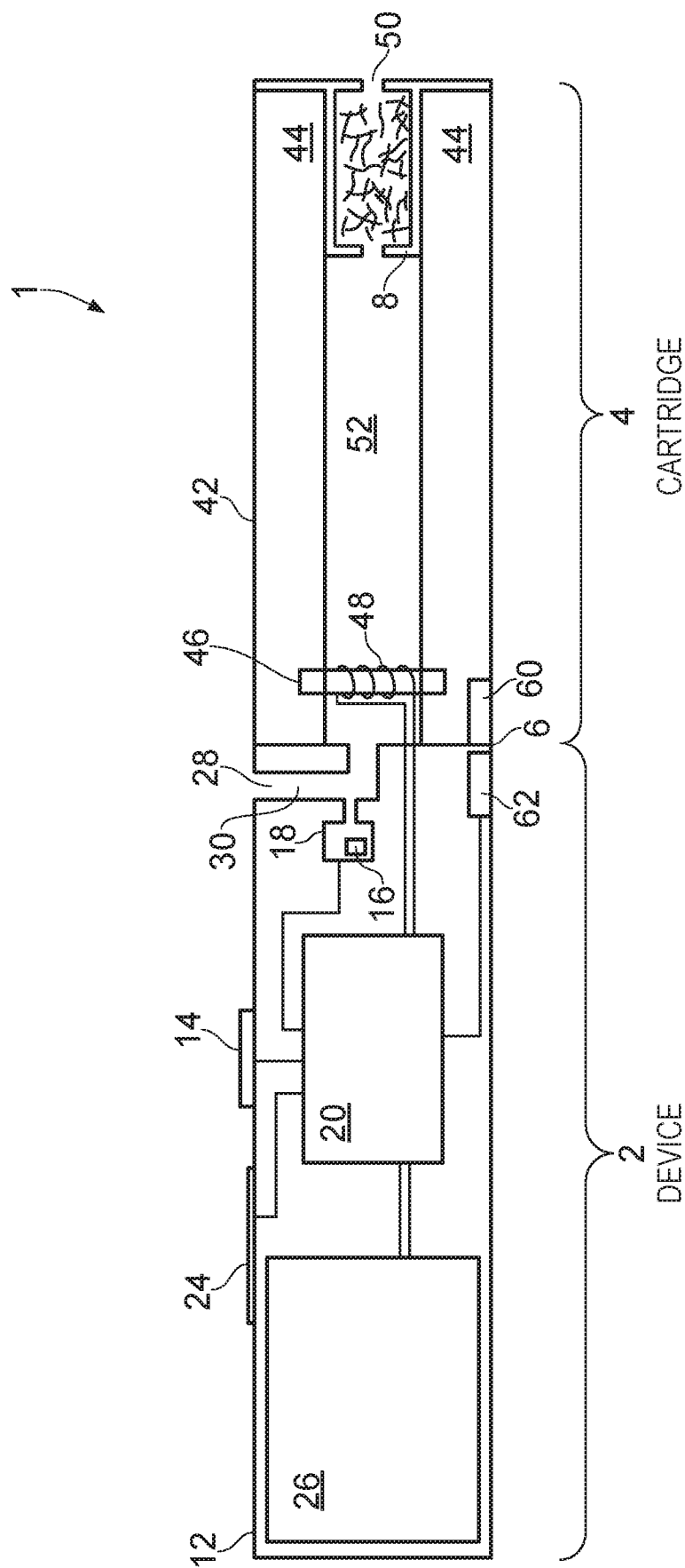

FIG. 1 is a cross-sectional view through an example e-cigarette 1 in accordance with certain embodiments of the disclosure. The e-cigarette 1 comprises two main components, namely a reusable part 2, which is referred to in the following description as an aerosol provision device and a replaceable/disposable cartridge part 4. In this specific example the e-cigarette 1 is assumed to be a hybrid device with the cartridge part 4 including a removable insert 8 comprising an insert housing containing a portion of shredded tobacco. However, the fact this example is a hybrid device is not in itself directly significant to the device activation functionality as described further herein.

In normal use the aerosol provision device 2 and the cartridge part 4 are releasably coupled together at an interface 6. When the cartridge part is exhausted or the user simply wishes to switch to a different cartridge part, the cartridge part may be removed from the aerosol provision device and a replacement cartridge part attached to the aerosol provision device in its place. The interface 6 provides a structural, electrical and air path connection between the two parts and may be established in accordance with conventional techniques, for example based around a screw thread, latch mechanism, or bayonet fixing with appropriately arranged electrical contacts and openings for establishing the electrical connection and air path between the two parts as appropriate. The specific manner by which the cartridge part 4 mechanically mounts to the aerosol provision device 2 is not significant to the principles described herein, but for the sake of a concrete example is assumed here to comprise a latching mechanism, for example with a portion of the cartridge being received in a corresponding receptacle in the aerosol provision device with cooperating latch engaging elements (not represented in FIG. 1). However as will be explained shortly, the interface 6 is configured so that a data storage unit 60 can be read by a reader 62. It will also be appreciated that the interface 6 in some implementations may not support an electrical connection between the respective parts. For example, in some implementations a vaporizer may be provided in the aerosol provision device rather than in the cartridge part, or the transfer of electrical power from the aerosol provision device to the cartridge part may be wireless (e.g. based on electromagnetic induction), so that an electrical connection between the aerosol provision device and the cartridge part is not needed.

The cartridge part 4 may in accordance with certain embodiments of the disclosure be broadly conventional. In FIG. 1, the cartridge part 4 comprises a cartridge housing 42 formed of a plastics material. The cartridge housing 42 supports other components of the cartridge part and provides the mechanical interface 6 with the aerosol provision device 2. The cartridge housing is generally circularly symmetric about a longitudinal axis along which the cartridge part couples to the aerosol provision device 2. In this example the cartridge part has a length of around 4 cm and a diameter of around 1.5 cm. However, it will be appreciated the specific geometry, and more generally the overall shapes and materials used, may be different in different implementations.

Within the cartridge housing 42 is a reservoir 44 that contains liquid vapor precursor material. The liquid vapor precursor material may be conventional, and may be referred to as e-liquid. The liquid reservoir 44 in this example has an annular shape with an outer wall defined by the cartridge housing 42 and an inner wall that defines an air path 52 through the cartridge part 4. The reservoir 44 is closed at each end with end walls to contain the e-liquid. The reservoir 44 may be formed in accordance with conventional techniques, for example it may comprise a plastics material and be integrally molded with the cartridge housing 42.

The flavor element insert (tobacco pod) 8 in this example is inserted into an open end of air path 52 opposite to the end of the cartridge 4 which couples to the control unit 2 and is retained by a friction fit. The housing for the flavor element insert 8 includes a collar that abuts the end of the cartridge housing 42 to prevent over insertion. The housing for the flavor element insert 8 also includes an opening at each end to allow air drawn along the air path 52 during use to pass through the flavor element insert 8 and so pick up flavors from the flavorant within (tobacco in this example) before exiting the cartridge 4 though a mouthpiece outlet 50 for user inhalation.

The cartridge part 4 further comprises a wick 46 and a heater (vaporizer) 48 located towards an end of the reservoir 44 opposite to the mouthpiece outlet 50. In this example the wick 46 extends transversely across the cartridge air path 52 with its ends extending into the reservoir 44 of e-liquid through openings in the inner wall of the reservoir 44. The openings in the inner wall of the reservoir are sized to broadly match the dimensions of the wick 46 to provide a reasonable seal against leakage from the liquid reservoir into the cartridge air path without unduly compressing the wick, which may be detrimental to its fluid transfer performance.

The wick 46 and heater 48 are arranged in the cartridge air path 52 such that a region of the cartridge air path 52 around the wick 46 and heater 48 in effect defines a vaporization region for the cartridge part. E-liquid in the reservoir 44 infiltrates the wick 46 through the ends of the wick extending into the reservoir 44 and is drawn along the wick by surface tension/capillary action (i.e. wicking). The heater 48 in this example comprises an electrically resistive wire coiled around the wick 46. In this example the heater 48 comprises a nickel chrome alloy (Cr20Ni80) wire and the wick 46 comprises a glass fiber bundle, but it will be appreciated the specific vaporizer configuration is not significant to the principles described herein. In use electrical power may be supplied to the heater 48 to vaporize an amount of e-liquid (vapor precursor material) drawn to the vicinity of the heater 48 by the wick 46. Vaporized e-liquid may then become entrained in air drawn along the cartridge air path from the vaporization region through the flavor element insert 8 and out the mouthpiece outlet 50 for user inhalation.

The rate at which e-liquid is vaporized by the vaporizer (heater) 48 will depend on the amount (level) of power supplied to the heater 48 during use. Thus electrical power can be applied to the heater to selectively generate vapor from the e-liquid in the cartridge part 4, and furthermore, the rate of vapor generation can be changed by changing the amount of power supplied to the heater 48, for example through pulse width and/or frequency modulation techniques.

The aerosol provision device 2 comprises an outer housing 12 with an opening that defines an air inlet 28 for the e-cigarette, a battery 26 for providing operating power for the electronic cigarette, control circuitry 20 for controlling and monitoring the operation of the electronic cigarette, a user input button 14, an inhalation sensor (puff detector) 16, which in this example comprises a pressure sensor located in a pressure sensor chamber 18, and a visual display 24.

The outer housing 12 may be formed, for example, from a plastics or metallic material and in this example has a circular cross-section generally conforming to the shape and size of the cartridge part 4 so as to provide a smooth transition between the two parts at the interface 6. In this example, the aerosol provision device has a length of around 8 cm so the overall length of the e-cigarette when the cartridge part and aerosol provision device are coupled together is around 12 cm. However, and as already noted, it will be appreciated that the overall shape and scale of an electronic cigarette implementing an embodiment of the disclosure is not significant to the principles described herein.

The air inlet 28 connects to an air path 30 through the aerosol provision device 2. The aerosol provision device air path 30 in turn connects to the cartridge air path 52 across the interface 6 when the aerosol provision device 2 and cartridge part 4 are connected together. The pressure sensor chamber 18 containing the pressure sensor 16 is in fluid communication with the air path 30 in the aerosol provision device 2 (i.e. the pressure sensor chamber 18 branches off from the air path 30 in the aerosol provision device 2). Thus, when a user inhales on the mouthpiece opening 50, there is a drop in pressure in the pressure sensor chamber 18 that may be detected by the pressure sensor 16 and also air is drawn in through the air inlet 28, along the aerosol provision device air path 30, across the interface 6, through the vapor generation region in the vicinity of the atomiser 48 (where vaporized e-liquid becomes entrained in the air flow when the vaporizer is active), along the cartridge air path 52, and out through the mouthpiece opening 50 for user inhalation.

The battery 26 in this example is rechargeable and may be of a conventional type, for example of the kind normally used in electronic cigarettes and other applications requiring provision of relatively high currents over relatively short periods. The battery 26 may be recharged through a charging connector in the aerosol provision device housing 12, for example a USB connector.

The user input button 14 in this example is a conventional mechanical button, for example comprising a spring mounted component which may be pressed by a user to establish an electrical contact. In this regard, the input button may be considered to provide a manual input mechanism for the terminal device, but the specific manner in which the button is implemented is not significant. For example, different forms of mechanical button or touch-sensitive button (e.g. based on capacitive or optical sensing techniques) may be used in other implementations. The specific manner in which the button is implemented may, for example, be selected having regard to a desired aesthetic appearance.

The display 24 is provided to give a user with a visual indication of various characteristics associated with the electronic cigarette, for example current power setting information, remaining battery power, and so forth. The display may be implemented in various ways. In this example the display 24 comprises a conventional pixilated LCD screen that may be driven to display the desired information in accordance with conventional techniques.

The control circuitry 20 is suitably configured/programmed to control the operation of the electronic cigarette to provide functionality in accordance with embodiments of the disclosure as described further herein, as well as for providing conventional operating functions of the electronic cigarette in line with the established techniques for controlling such devices. The control circuitry (processor circuitry) 20 may be considered logically to comprise various sub-units/circuitry elements associated with different aspects of the electronic cigarette's operation in accordance with the principles described herein and other conventional operating aspects of electronic cigarettes, such as display driving circuitry and user input detection. It will be appreciated the functionality of the control circuitry 20 can be provided in various different ways, for example using one or more suitably programmed programmable computer(s) and/or one or more suitably configured application-specific integrated circuit(s)/circuitry/chip(s)/chipset(s) configured to provide the desired functionality.

Thus the vapor provision system 1 comprises a user input button 14 and an inhalation sensor 16. In accordance with certain embodiments of the disclosure the control circuitry 20 is configured to receive signaling from the inhalation sensor 16 and to use this signaling to determine if a user is inhaling in the electronic cigarette and also to receive signaling from the input button 14 and to use this signaling to determine if a user is pressing (i.e. activating) the input button. These aspects of the operation of the electronic cigarette (i.e. puff detection and button press detection) may in themselves be performed in accordance with established techniques (for example using conventional inhalation sensor and inhalation sensor signal processing techniques and using conventional input button and input button signal processing techniques). More details of a puff control response can be found in our co-pending UK patent application GB1718462.3.

As explained in more detail below, the cartridge 4 is configured to include a data storage unit 60 which, in some examples, forms part of an outer surface of a housing 42 of the cartridge 4. The aerosol provision device 2 includes a reader 62 connected to the controller 20 which is configured to read the data from the data storage unit 60. In one example, the data storage unit 18 is configured to store an identifier which is related to the identity of the cartridge 4. This is explained in more detail below. It should be appreciated that while only one data storage unit 18 is shown in FIG. 1, the cartridge 4 may be provided with one or more data storage units 60, each having the same or different information (which might be the same identifier for each data storage unit or different identifiers, e.g., two or more different identifiers).

Figure 2A:
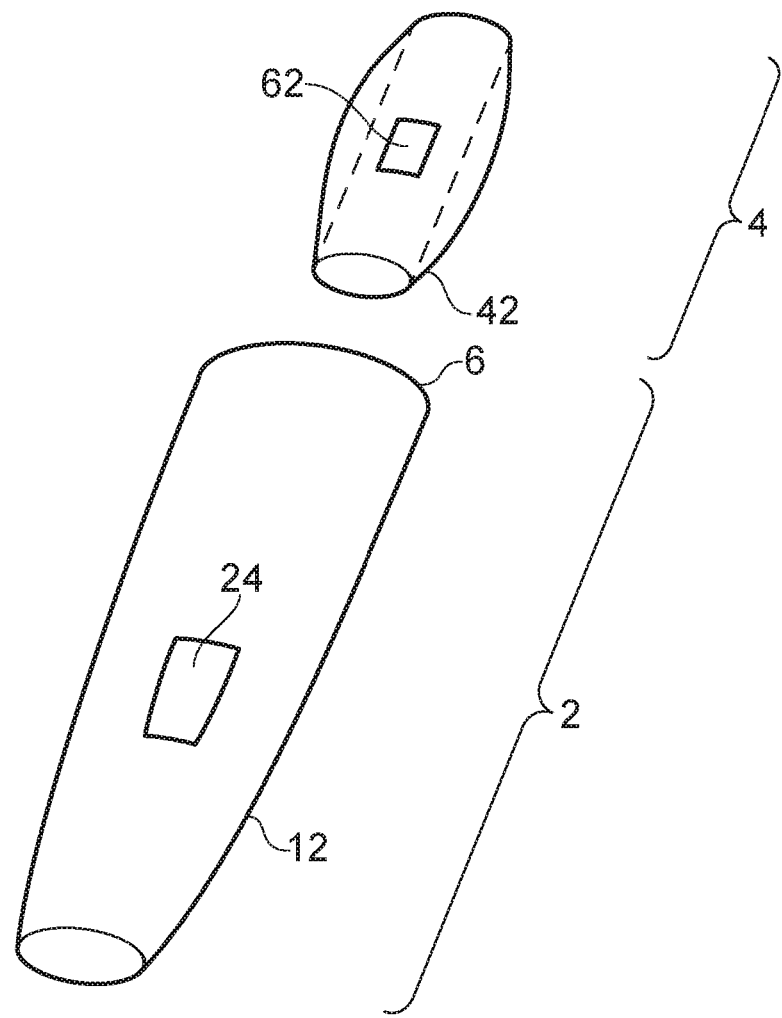
Figure 2B:
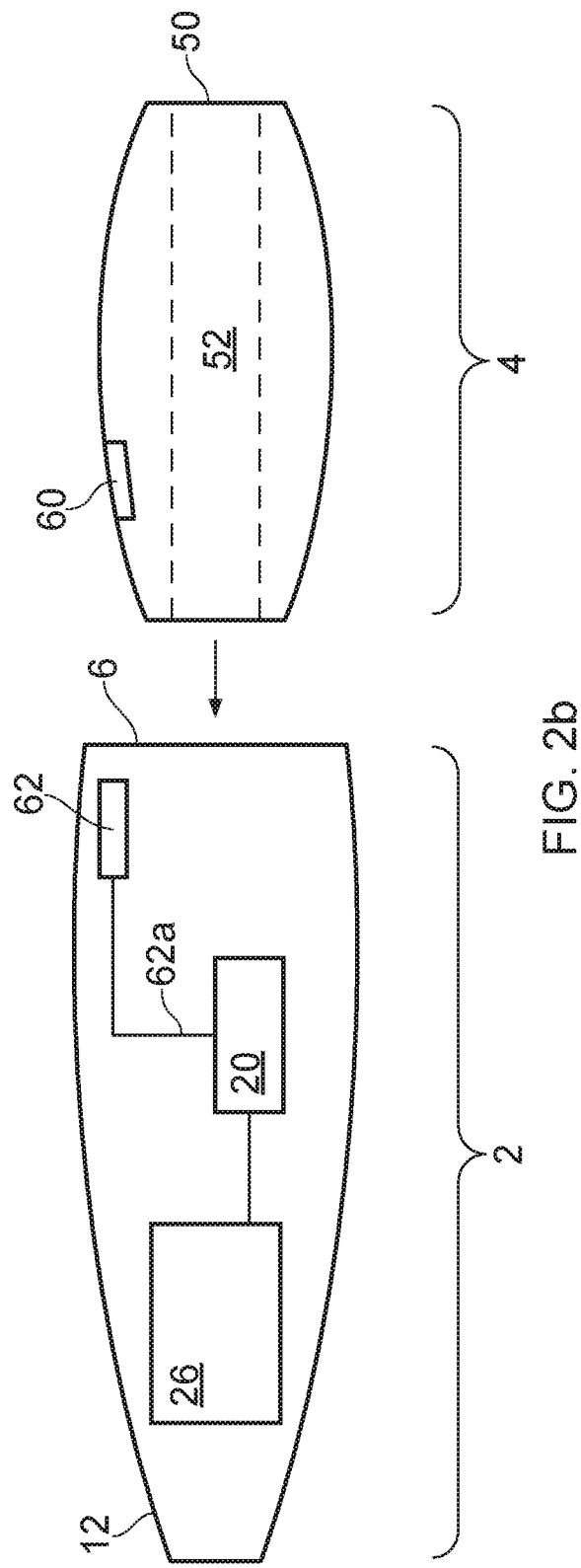
Figure 3A:
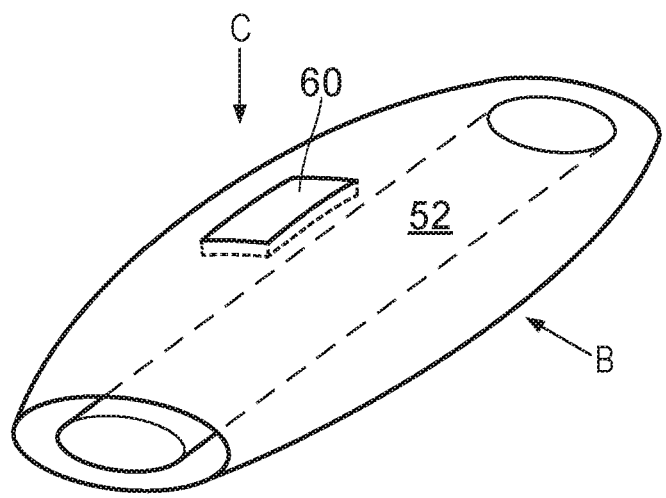
Figure 3B:
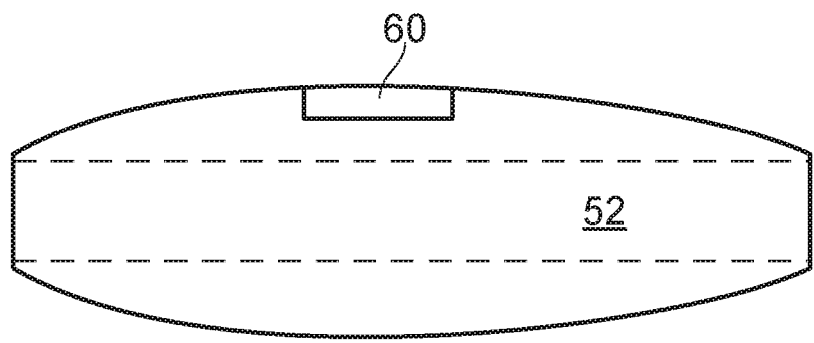
Figure 3C:
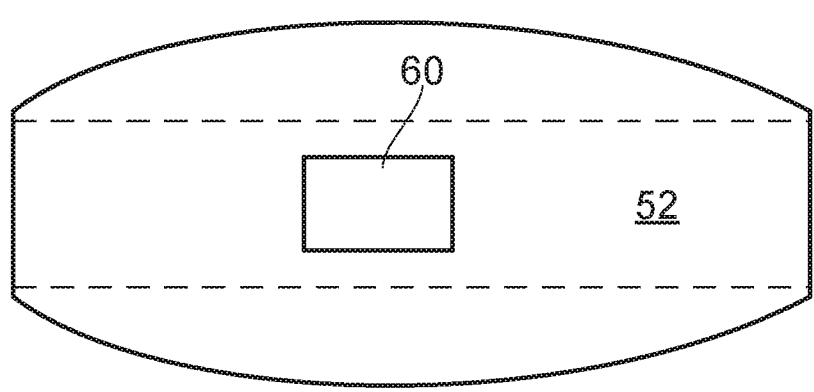
Figures 4A, 4B, 4C:
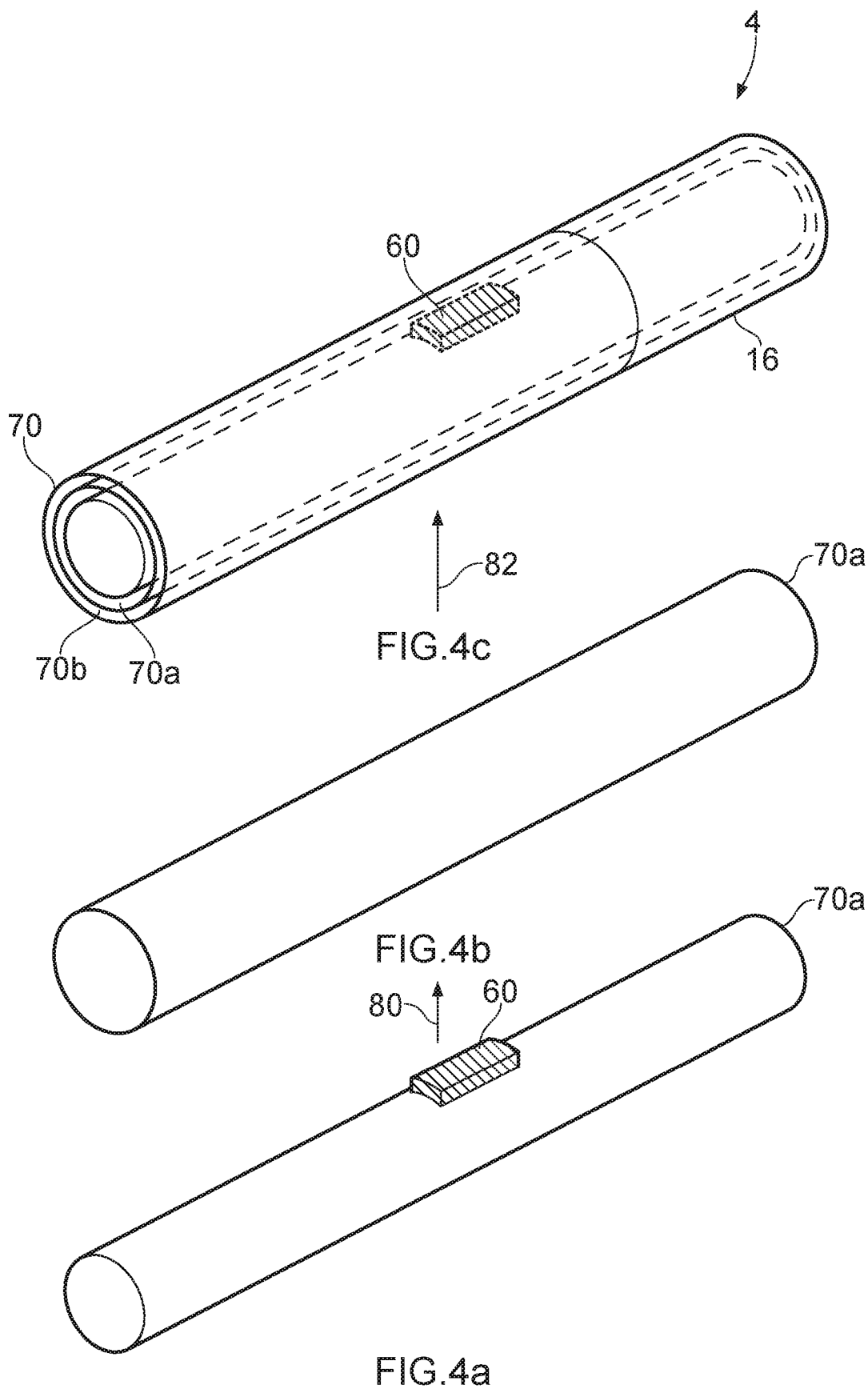
Figure 5A:
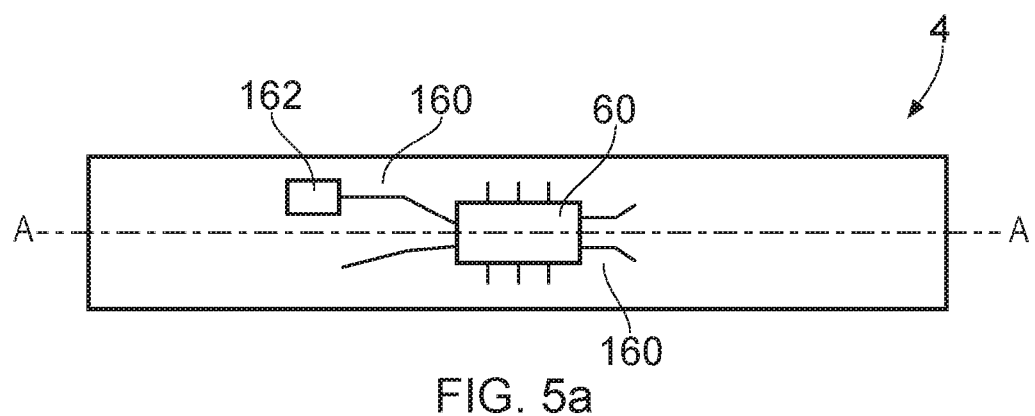
FIG. 5a is a representation of a plan view of another example of a cartridge showing a data storage unit embedded below a surface of a housing of the device and including electrical circuits.
Figure 5B:
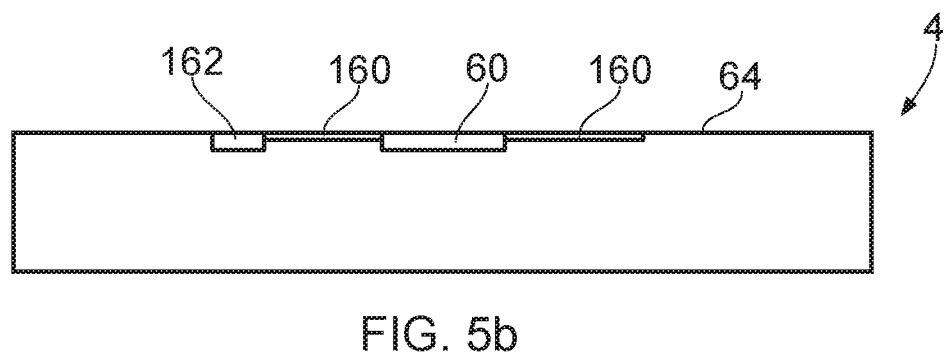
FIG. 5b is a representation of a side elevation of the cartridge through a section A-A.
Figure 6:
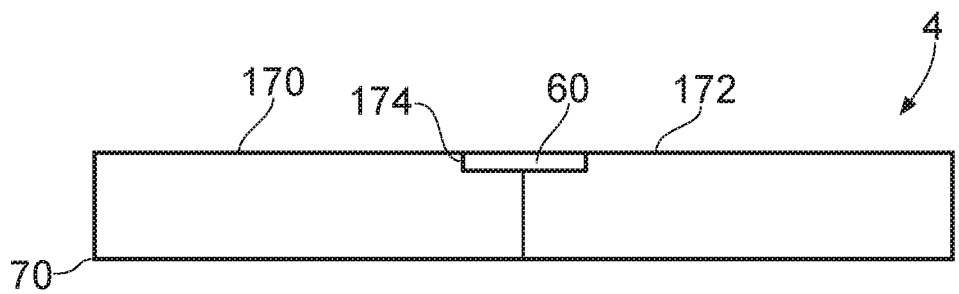
FIG. 6 is a representation of a side elevation of another example of a cartridge embodying the present technique having a housing which is made of two parts which are configured to form a recess in which a data storage unit is contained.

FIGS. 2a and 2b provide another example configuration of the aerosol provision system shown in FIG. 1 with the same parts having the same numerical designations. FIG. 2a provides a three dimensional representation and FIG. 2b provides an aspect view. As shown in FIG. 2a, the aerosol provision device 2 is configured with a housing 12 having curved side walls in a more tear drop shape and the aerosol provision device 2 is configured with an interface 6 which can receive the cartridge 4 partially within a channel provided within the aerosol provision device 2. As with the example embodiment shown in FIG. 1, the data storage unit forms part of the housing 42 of the cartridge 4. As shown in FIG. 2b, the data storage unit 60 is positioned within the cartridge 4 at a location at which the data storage unit 60 can be read by a reader 62. The reader 62 is located on or within the aerosol provision device 2 so that when the cartridge 4 is received within the interface 6 of the aerosol provision device 2, the reader 62 can read the data present on the data store 60.

As illustrated by the example embodiments of FIGS. 1, 2a and 2b, the data storage unit 60 is an approximately cuboidal box having various circuitry located therein, which may include a plurality of transistors suitable for storing data. The data storage unit 60 can be embedded in the outer surface of the housing 42. However, in other implementations, the data storage unit 60 may be located within the housing 42 of the cartridge 4 as opposed to on an outer surface of the housing 42. For example, the data storage unit 60 may be located between two sub-layers of the housing 42. In some example embodiments, the data storage unit 60 may be integrally formed with a component of the cartridge 4, for example a layer of the housing 42. The data storage unit 42 may be integrally formed in the housing during manufacture of the housing 42, for example.

In some examples, the data storage unit 60 may be configured to store an identifier which identifies the cartridge 4 as the information relating to the cartridge 4. The data reader 62 may be configured to read the data storage unit 60 and obtain the identifier therefrom. The data reader 62 is coupled to the control unit 20 via any suitable data connection, e.g., via electrically conductive wires 62a, and is arranged to transmit a signal indicative of the identifier to the control circuitry 20. As will be described in more detail below, the control circuitry 20 receives the signal indicative of the identifier of the cartridge 4 and is arranged to cause the device 4 to perform an action on the basis of the identifier.

The data storage unit 62 in the present example is configured to store a digital representation of the identifier (e.g., a 128-bit identification number). For example, the identifier may be in the form of a binary sequence or of a hexadecimal sequence.

In this example, the data storage unit 62 is programmable, meaning that the identifier can be programmed into the data storage unit 62. That is, the data storage units for two cartridges 62 may structurally be the same, but can be programmed to store different identifiers accordingly. The programming may be performed before, during, or after manufacture of the cartridge 4. This may simplify the manufacturing process, particularly in the application of the data storage unit 62 to (or in) the cartridge. The data storage unit 62 may be a write once data storage unit 62 (e.g., a write once read many (WORM) data storage unit 62). That is, the data storage unit 62 can be written to once (i.e., when the identifier is applied) and then cannot easily be written to again. In other implementations, the data storage unit 62 may be re-writable (i.e., it can be written to multiple times) depending upon the application at hand.

The identifier is provided to identify the cartridge. This may be on the basis of the type of aerosolizable material 44 of the cartridge 10. Alternatively or additionally, the identifier may identify an origin (geographical and/or manufacturing) of the cartridge 44. Alternatively or additionally, the identifier may uniquely identify the cartridge 4.

As explained above, the cartridge 4 includes a data storage unit 60 configured to store information relating to the cartridge 4, such as an identifier identifying the cartridge or an indication of properties associated with the cartridge 4, the aerosol provision device 30 being configured to detect the information stored in the data storage unit 60 when engaged with the cartridge. The data storage unit 60 is integrally formed with one or more walls of the housing. For example, the data storage unit may be integrally formed with the one or more walls of the housing 42 by embedding circuitry forming the data storage unit 60 below the surface of the housing 42 with an effect that the circuitry cannot be removed without damaging either the data storage unit or the cartridge 4 so that one or both of the data storage unit 60 or the cartridge 4 is rendered inoperable.

FIGS. 3*a*, 3*b* and 3*c* provide further detailed illustration of the cartridge 4. FIG. 3*a* provides a three-dimensional representation of a cartridge 4 which, as explained above, includes the aerosolizable material 44 and in use is arranged to generate the aerosol for the user in accordance with the principles explained above. As shown in FIG. 3*a* as a three-dimensional representation, the data storage unit 60 is embedded below the surface of the cartridge 4. As shown in FIGS. 3*b* and 3*c* which provide an aspect and plan view of the cartridge 4 from positions B and C of FIG. 3*a*, the data storage unit 60 is embedded within one of the walls of a housing of the cartridge 60. In one example the data storage unit 60 is embedded below a surface of the cartridge 4. In this example, the data storage unit 60 is embedded below a surface of one of the walls of the housing of the cartridge. In one example the data storage unit 60 may be bonded to the material of the housing, using an adhesive so that removal of the data storage unit 60 is likely to cause the data storage unit 60 to break rather than the housing of the cartridge 4. It is also possible that the housing itself will be breached by attempted removal of the data storage unit 60 with the effect that a user is not able to inhale the aerosol generated by the cartridge 4, but in some examples, this may be less likely as a result of a relative strength of the housing walls compared with the strength of the data storage unit. In one example, the housing may be formed from a brittle or frangible material such as some form of plastic which may disintegrate if the data storage unit 60 is removed.

A related illustration of the arrangement shown in FIGS. 3*a*, 3*b* and 3*c* is shown in FIGS. 4*a*, 4*b* and 4*c* which provide an illustration of a construction of the cartridge 4. As an alternative example, the cartridge 4 is shown as a rod similar to the example shown in FIG. 1. As indicated from the embodiments shown in FIGS. 3*a*, 3*b* 3*c*, the data storage unit 62 may be in one example formed into the cartridge 4 below a surface of the housing. FIGS. 4*a*, 4*b* and 4*c* show an illustration of the construction of a cartridge 4 in which a housing of the article 70 is formed from first and second layers 70*a*, 70*b*, by for example over-molding plastic layers. As shown in FIG. 4*a* a first layer of the housing 70*a* is formed and a data storage unit 60 is disposed on the surface of the first layer 70*a*. A second layer 70*b* is then formed over the top of the first layer 70*a* of the housing, as indicated by an arrow 80 so that the completed article shown in FIG. 4*c* is formed of the first and second layers with the second layer 70*b* overlaying the first layer as represented by an arrow 82 so that the data storage unit 60 is embedded below the surface of the second or outer layer 70*b* within a cavity formed in the second layer during fabrication of the second layer. The data storage unit 60 is thereby embedded within the walls of the cartridge 4. According to this example, an over-molding technique is used to mold the first layer 70*a*, placing the data storage unit on the first layer 50*a*, and then molding the second layer 70*b* on top of the first layer 70*a* and the data storage unit 60. The first and second layers 70*a*, 70*b* may be formed from plastic.

A further example embodiment is shown in FIGS. 5*a* and 5*b*. FIG. 5*a* provides a plan view illustrating an arrangement in which a data storage unit 60 is embedded in a recess of one of the walls of the housing of the cartridge 4 whereas FIG. 5*b* shows an elevation view of the plan view through a section A-A of FIG. 5*a*. As shown in FIGS. 5*a* and 5*b*, the data storage unit 60 is embedded below the surface of the housing of the cartridge 4. As shown in the plan view FIG. 5*a*, various wires forming a circuit 160 for the data storage unit 60 are printed on the surface of the housing of the cartridge 4 which connect to the data storage unit 60. One of the printed wires provides a connection to a battery 162. As is shown in FIG. 5*b* in the elevation view, the battery 162 and the data storage unit 60 are embedded below a surface 164 of the cartridge 4, whereas the wires forming a circuit 160 including the data storage unit 60 are printed on the surface of the cartridge. Accordingly any attempt to remove the data storage unit 60 will cause the circuit to be broken thereby preventing operation of the cartridge when disposed within the aerosol provision device.

FIG. 6 provides another example embodiment in which the data storage unit 60 is embedded in one of the walls of the housing 70 of the cartridge 4. However in the example shown in FIG. 6, the cartridge 4 is comprised of two parts 170, 172 which form between them a recess 174 in which the data storage unit is disposed. Thus when formed during manufacture, the two parts are configured with the recess 174 in which the data storage unit 60 can be housed. In another example the memory and/or circuitry is placed/printed on the surface of the cartridge on an overlapping part of consumable (e.g., two halves of a liquid reservoir). If the user attempts to refill the cartridge by opening the two halves, the memory/circuitry is broken. This could also be embedded in a recess as well. Again any attempt to remove the data storage unit 60 will cause the two parts 170, 172 to be separated thereby rendering the cartridge inoperable. Accordingly the two parts/halves of the cartridge 170, 172 can act as a tamper-proof seal to prevent refilling of the cartridge with unauthorized liquids for example. If the data storage unit 60 is removed or broken, the cartridge 4 will no longer function when placed in the aerosol provision device 30. According to this example, the housing 70 of the cartridge 4 may be formed of two separate parts/layers 170, 172 which are joined together, where the separate parts define a recess for housing the data storage unit 60. As for the example shown in FIGS. 4*a*, 4*b*, 5*a* and 5*b*, the data storage unit 60 may be completely embedded within the wall/housing of the cartridge 4 such that the user cannot physically access the data storage unit 60. In one implementation the memory and/or circuitry is placed/printed on the surface of the cartridge on an overlapping part of consumable (e.g., two halves of a liquid reservoir). If the user attempts to refill the cartridge by opening the two halves, the memory/circuitry is broken.

FIG. 7 provides a further example in which the circuit forming the data storage unit 60 is disposed on a surface of the cartridge 4 so that it can be seen from the outside by the user. Accordingly the data storage unit 60 and associated circuit 160 can be configured to provide a recognizable pattern which can be arranged to represent an authentication of the cartridge as being manufactured by a known source. The user can therefore be confident that the cartridge is a genuine article.

Another example embodiment is shown in FIG. 8. FIG. 8 provides a three dimensional representation of an cartridge 4 including a data storage unit 60, in which the data storage unit 60 is configured to be frangibly attached in a through-hole 180 of a housing of the article with connections to electrical circuits. According to this example, the through-hole 180 provides passage of air to pass freely. However, when the data storage unit 60 is disposed in the through-hole 180, a seal of the through-hole is formed to that the aerosol can pass to the inhaler, whereas without the data storage unit 60 in which, the aerosol will pass through the through-hole 180 preventing the user from inhaling the aerosol. By attaching the data storage unit 60 to the walls of the housing in the through-hole 180, with a frangible attachment, attempted removal for the data storage unit 60 will both damage the data storage unit 60 and render the cartridge inoperable. In some embodiments circuitry 160 forming the data storage unit 60 may include different components some of which may block the through-hole 180, whereas one or more other components may be embedded into a wall of the housing of the cartridge. As a result, attempted removal of the data storage unit 60 is likely to render both the data storage unit 60 inoperable and the cartridge in operable because the through-hole 60 will be open.

According to the above example embodiments the data storage unit 60 is provided on or within the housing/walls of the cartridge with an arrangement which prevents or at least hinders removal of the data storage unit from one cartridge to be replaced by another.

In one example the data storage unit may be printed on a surface of the cartridge or attached to the cartridge by printing. The data storage unit may be read wirelessly, for example, via RFID tags (passive or active) according to the embodiments explained below, when brought into close contact/proximity of a reader on the device. Printing the data storage unit 60 on the surface of the cartridge can have an effect that any attempts to remove the data storage unit 60 may likely damage the data storage unit itself thus preventing transfer of the data storage unit from one cartridge, which may be a genuine cartridge to a second cartridge for example a counterfeit cartridge.

In terms of electrical connections to the data storage unit for each of the above examples, the data storage unit 60 may be operated wirelessly or the data storage unit 60 may have physical electrical contacts that couple to the battery of a aerosol provision device for example. Whilst in some embodiments the data storage unit 60 may be completely embedded in the housing, in other embodiments, the housing/wall may have the data storage unit partially embedded. For example, the housing may define a recess for receiving a data storage unit. However one face of the data storage unit may be exposed. The tolerances between the edge of the recess and the edge of the data storage unit may be very small, for example, smaller than the tip of a screwdriver or the like (less than 500 micrometers), meaning the user is not able to remove or tamper with the data storage unit easily.

As explained in some examples below, the data storage unit may be provided via miniaturized RFID tags (referred to as RFID dust), which have a small size for example as small as 1 mm×1 mm) and generally have a short transmission range. These RFID tags can be embedded in the material forming the cartridge (e.g., the plastic housing), or at any other location in the cartridge. Hence, it is not possible to isolate and remove the miniaturized RFID tags from the cartridge, again preventing the transfer of genuine tags to non-genuine consumables.

While the above described embodiments have in some respects focused on some specific example aerosol provision systems, it will be appreciated the same principles can be applied for aerosol provision systems using other technologies. That is to say, the specific manner in which various aspects of the aerosol provision system function are not directly relevant to the principles underlying the examples described herein.

As illustrated by the example embodiments described above cartridges of e-cigarettes embodying the present technique can be configured with different shapes, although these are arranged to be compatible with the aerosol provision devices so that a reader of the devices can read data stored in the data storage unit.

According to the present disclosure, embodiments can provide an aerosol provision system for generating an aerosol for user inhalation which includes a cartridge comprising a housing containing an aerosolizable material, and an aerosol provision device. In some examples. the aerosol provision system can be described as "non-combustible", where a constituent aerosol-generating material of the aerosol provision system (or component thereof) is not combusted or burned in order to facilitate delivery of at least one substance to a user. In some embodiments, the non-combustible aerosol provision system may be a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable (or cartridge) for use with the non-combustible aerosol provision device.

In some embodiments, the disclosure relates to consumables comprising aerosol-generating material and configured to be used with non-combustible aerosol provision devices. These consumables are sometimes referred to as articles throughout the disclosure.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energized so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

In some embodiments, the consumable (or cartridge) for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An aerosol provision system for generating an aerosol for user inhalation, the system comprising:
   a cartridge comprising a housing containing an aerosolizable material, and
   an aerosol provision device having an interface configured operatively to receive the cartridge and configured to cause the aerosolizable material to generate the aerosol for user inhalation by energizing the aerosol generating material,
   wherein the cartridge includes a data storage unit configured to store information relating to the cartridge, the aerosol provision device being configured to detect the information stored in the data storage unit when the cartridge is received by the aerosol provision device and wherein the data storage unit is integrally formed with one or more walls of the housing.

2. The system as claimed in claim 1, wherein the data storage unit is integrally formed with the one or more walls of the housing by the process of embedding circuitry forming the data storage unit below a surface of one of the walls of the housing.

3. The system as claimed in claim 2, wherein the data storage unit is integrally formed with the one or more walls of the housing such that removal of the data storage unit causes one or both of the data storage unit or the cartridge to be rendered inoperable.

4. The system as claimed in claim 2, wherein the one or more walls of the housing are formed from a plurality of layers and the circuitry of the data storage unit is embedded in one of the layers.

5. The system as claimed in claim 2, wherein the data storage unit is integrally formed with one or more of the walls of the housing by disposing the circuitry of the data storage unit on a first inner layer of the wall and forming a second outer layer over the inner layer, the circuitry of the data storage unit being disposed in a cavity formed between the first inner layer and the second outer layer.

6. The system as claimed in claim 1, wherein the data storage unit is integrally formed with the one or more walls of the housing by disposing circuitry forming the data storage unit on the surface of the housing.

7. The system as claimed in claim 6, wherein the data storage unit is integrally formed with the one or more walls of the housing with an effect that the surface of the housing forms a substrate for the circuitry of the data storage unit and the circuitry cannot be removed without damaging either the data storage unit or the aerosol generating material rendering one or both of the data storage unit or the aerosol generating material inoperable.

8. The system as claimed in claim 7, wherein the circuitry of the data storage unit is visible on the cartridge.

9. The system as claimed in claim 1, wherein circuitry forming the data storage unit is disposed in one or more recesses within a surface of the one or more walls of the housing with an effect that the circuitry cannot be removed without damaging either the data storage unit or the aerosol generating material, rendering one or both of the data storage unit or the aerosol generating material inoperable.

10. The system as claimed in claim 9, wherein the circuitry of the data storage unit is configured to provide a recognizable shape for authentication of the aerosol generating material.

11. The system as claimed in claim 9, wherein the circuitry is printed on an outer surface of the one or more walls of the housing.

12. The system as claimed in claim 1, wherein the cartridge is formed from two parts and each part is configured to form a cavity for the data storage unit, the data storage unit being integrally formed with the one or more walls of the housing by disposing the data storage unit in the cavity when the two parts are fixed together.

13. The system as claimed in claim 1, wherein the cartridge is configured with a through-hole on one of the walls of the housing, the through-hole, when open, allowing the aerosol to pass out of the cartridge, and the data storage unit is integrally formed with the one or more walls of the housing by forming at least part of circuitry of the data storage unit in the through-hole to block the though-hole so that in use the aerosol can be inhaled by a user.

14. The system as claimed claim 1, wherein the aerosol provision device is configured to perform an action when the information stored in the data storage unit of the cartridge is detected by the aerosol provision device.

15. The system as claimed in claim 14, wherein the action is to provide energy to the aerosol generating material to generate the aerosol or if the information is not detected then not providing energy to the aerosol generating material to cause the aerosol generating material to generate aerosol.

16. The system as claimed claim 1, wherein the information at least one of: identifies the type of aerosolizable material of the cartridge, identifies the origin of the cartridge, and uniquely identifies the cartridge.

17. A cartridge for use with an aerosol provision device, the cartridge comprising:
    a housing containing an aerosolizable material, the cartridge configured to cause the aerosolizable material to generate an aerosol for user inhalation when energy is provided to the aerosol generating material when the cartridge is received in an interface of the aerosol provision device, the cartridge including a data storage unit configured to store information relating to the cartridge for detection by the aerosol provision device,
    wherein the data storage unit is integrally formed with one or more walls of the housing.

18. The cartridge as claimed in claim 17, wherein the data storage unit is integrally formed with the one or more walls of the housing by embedding circuitry forming the data storage unit below a surface of one of the walls of the housing.

19. The cartridge as claimed in claim 18, wherein the data storage unit is integrally formed with the one or more walls of the housing such that removal of the data storage unit causes one or both of the data storage unit or the aerosol generating material to be rendered inoperable.

20. The cartridge as claimed in claim 18, wherein the one or more walls of the housing are formed from a plurality of layers and the circuitry of the data storage unit is embedded in one of the plurality of layers.

21. The cartridge as claimed in claim 18, wherein the data storage unit is integrally formed with one or more of the walls of the housing by disposing the circuitry of the data storage unit on a first inner layer of the wall and forming a second outer layer over the inner layer, the circuitry of the data storage unit being disposed in a cavity formed between the first inner layer and the second outer layer.

22. The cartridge as claimed in claim 17, wherein the data storage unit is integrally formed with the one or more walls of the housing by disposing circuitry forming the data storage unit on the surface of the housing such that the surface of the housing forms a substrate for the circuitry of the data storage unit and the circuitry cannot be removed without damaging either the data storage unit or the aerosol generating material rendering one or both of the data storage unit or the aerosol generating material inoperable.

23. The cartridge as claimed in claim 17, wherein circuitry forming the data storage unit is disposed in one or more recesses within a surface of the one or more walls of the housing with an effect that the circuitry cannot be removed without damaging either the data storage unit or the aerosol generating material, rendering one or both of the data storage unit or the aerosol generating material inoperable.

24. The cartridge as claimed in claim 23, wherein the circuitry of the data storage unit is visible on the cartridge.

25. The cartridge as claimed in claim 23, wherein the circuitry of the data storage unit is configured to provide a recognizable shape for authentication of the aerosol generating material.

26. The cartridge as claimed in claim 23, wherein the circuitry is printed on an outer surface of the one or more walls of the housing.

27. The cartridge as claimed in claim 17, wherein the cartridge is formed from two parts and each part is configured to form a cavity for the data storage unit, the data storage unit being integrally formed with the one or more walls of the housing by disposing the data storage unit in the cavity when the two parts are fixed together.

28. The cartridge as claimed in claim 17, wherein the housing is configured with a through-hole on one of the walls of the housing, the through-hole, when open, for allowing the aerosol to pass out of the cartridge, and the data storage unit is integrally formed with the one or more walls of the housing by forming at least part of circuitry of the data storage unit in the through-hole to block the though-hole so that in use the aerosol can be inhaled by a user.

29. A method of manufacturing a cartridge for use with an aerosol provision device, the method comprising:
    forming at least a part of a housing, and
    disposing an aerosolizable material within the housing, wherein the forming of the housing includes integrally forming one or more walls of the housing with a data storage unit.

30. The method as claimed in claim 29, wherein the integrally forming one or more walls of the housing with the data storage unit comprises integrally forming one or more walls of the housing by embedding circuitry forming the data storage unit below a surface of one of the walls of the housing.

31. The method as claimed in claim 29, wherein the integrally forming one or more walls of the housing with the data storage unit comprises
    forming a first inner layer of the housing,
    disposing the circuitry of the data storage unit on the first inner layer, and
    forming a second outer layer over the inner layer, the circuitry of the data storage unit being disposed in a cavity formed between the first inner layer and the second outer layer to integrally form the data storage unit in the wall formed on the housing.

32. The method as claimed in claim 29, wherein the integrally forming one or more walls of the housing with the data storage unit comprises
    forming a wall of the housing, and
    disposing circuitry forming the data storage unit in one or more recesses of a surface of the wall of the housing with an effect that the circuitry cannot be removed without damaging either the data storage unit or the aerosol generating material, rendering one or both of the data storage unit or the aerosol generating material inoperable.

33. The method as claimed in claim 32, wherein the circuitry of the data storage unit is visible on the cartridge.

34. The method as claimed in claim 32, wherein the disposing the circuitry forming the data storage unit in one or more recesses of a surface of the wall of the housing includes configuring the circuitry to provide a recognizable shape for authentication of the aerosol generating material.

35. The method as claimed in claim 32, wherein the integrally forming one or more walls of the housing with the data storage unit comprises
    forming a wall of the housing, and
    printing circuitry forming the data storage unit on an outer surface of the one or more walls of the housing.

36. The method as claimed in claim 29, wherein the integrally forming one or more walls of the housing with the data storage unit comprises
    forming the housing in at least two parts,
    forming between two of the parts a cavity for containing the data storage unit in one of the walls of the housing, and disposing the data storage unit in the cavity when the two parts are fixed together.

37. The method as claimed in claim 29, wherein the integrally forming one or more walls of the housing with the data storage unit comprises
   forming a wall of the housing with a through-hole, the through-hole, when open, for allowing the aerosol to pass out of the cartridge, and
   forming at least part of circuitry of the data storage unit in the through-hole to block the though-hole so that in use the aerosol can be inhaled by a user.

* * * * *

UNITED STATES PATENT AND TRADEMARK OFFICE
CERTIFICATE OF CORRECTION

PATENT NO. : 12,137,746 B2
APPLICATION NO. : 17/309822
DATED : November 12, 2024
INVENTOR(S) : Patrick Moloney et al.

Page 1 of 1

It is certified that error appears in the above-identified patent and that said Letters Patent is hereby corrected as shown below:

In the Claims

In Column 14, Claim 14, Line 62, "as claimed claim 1" should read -- as claimed in claim 1 --

In Column 15, Claim 16, Line 4, "as claimed claim 1" should read -- as claimed in claim 1 --

Signed and Sealed this
Fifteenth Day of April, 2025

Coke Morgan Stewart
*Acting Director of the United States Patent and Trademark Office*